United States Patent [19]
Fioravanti

[11] Patent Number: 5,774,294
[45] Date of Patent: Jun. 30, 1998

[54] SERVO TRACK WRITER WITH TUNED DAMPER

[75] Inventor: Louis John Fioravanti, Edmond, Okla.

[73] Assignee: Seagate Technology, Inc., Scotts Valley, Calif.

[21] Appl. No.: 701,164

[22] Filed: Aug. 21, 1996

[51] Int. Cl.$^6$ .................................................. G11B 21/02
[52] U.S. Cl. ........................................... 360/75; 360/106
[58] Field of Search ............................ 360/75, 105, 106, 360/109, 104

[56] References Cited

U.S. PATENT DOCUMENTS

| | | | |
|---|---|---|---|
| 5,014,146 | 5/1991 | Takatsuka et al. | 360/106 |
| 5,164,863 | 11/1992 | Janz. | |
| 5,231,556 | 7/1993 | Blanks. | |
| 5,241,430 | 8/1993 | Janz. | |
| 5,262,907 | 11/1993 | Duffy et al.. | |
| 5,661,615 | 8/1997 | Waugh et al. | 360/75 |

Primary Examiner—Nabil Hindi
Attorney, Agent, or Firm—Bill D. McCarthy; Edward P. Heller, III; Randall K. McCarthy

[57] ABSTRACT

A servo track writer used for the writing of servo information to a head disc assembly, the servo track writer including a tuned damper as part of a pusher block assembly, the tuned damper reducing the effects of errors in the written servo information as a result of resonant frequencies induced in the pusher block assembly. The pusher block assembly mechanically advances an actuator of the head disc assembly, the actuator including a head which selectively magnetizes portions of a rotating disc of the head disc assembly to write the servo information. The tuned damper portion of the pusher block assembly comprises a dampening block having a selected mass and a dampening pad comprising a layer of compliant material, the dampening pad isolating the dampening block from the rest of the pusher block assembly. The desired resonant frequency response of the pusher block assembly is achieved through selection of the mass of the dampening block and the compliance of the dampening pad.

10 Claims, 2 Drawing Sheets

SERVO TRACK WRITER WITH TUNED DAMPER

BACKGROUND OF THE INVENTION

1. Field of the Invention

This invention relates generally to the field of disc drive data storage devices, and more particularly, but not by way of limitation, to improvements in the writing of servo information to a disc drive utilizing a tuned damper to reduce the effects of system resonances upon the written servo information.

2. Discussion

Disc drives are commonly used in workstations, personal computers, laptops and other computer systems to store large amounts of data in a form that can be made readily available to a user. In general, a disc drive comprises one or more magnetic discs that are rotated by a spindle motor at a constant high speed. The surface of each disc is divided into a series of data tracks which are spaced radially from one another across a band having an inner diameter and an outer diameter. The data tracks extend generally circumferentially around the discs and store data in the form of magnetic flux transitions within the radial extent of the tracks on the disc surfaces. Typically, each data track is divided into a number of data sectors that store fixed sized data blocks.

A head includes an interactive element such as a magnetic transducer which senses the magnetic transitions on a selected data track to read the data stored on the track, or to transmit an electrical signal that induces magnetic transitions on the selected data track to write data to the track. The head includes a read/write gap that positions the active elements of the head at a position suitable for interaction with the magnetic transitions on the data tracks of a disc as the disc rotates.

As is known in the art, each head is mounted to a rotary actuator arm and is selectively positionable by the actuator arm over a preselected data track of the disc to either read data from or write data to the preselected data track. The head includes a slider assembly having an air bearing surface that causes the head to fly over the data tracks of the disc surface due to fluid air currents caused by rotation of the disc.

Typically, several discs are stacked on top of each other and the surfaces of the discs are accessed by the heads mounted on a complementary stack of actuator arms which compose an actuator assembly, or "E-block". The E-block generally includes head wires which conduct electrical signals from the heads to a flex circuit, which in turn conducts the electrical signals to a printed circuit board (PCB) mounted to a disc drive base deck.

Disc drives typically include a servo system for controlling the position of the heads with respect to the discs. One type of servo system is a dedicated servo system, in which one entire disc surface is identified as a servo surface and contains servo information written to servo tracks thereon. The remaining disc surfaces are used to store data on corresponding data tracks. The head associated with the servo surface is commonly referred to as a servo head and the remaining heads are referred to as data heads. Thus, by controlling the position of the servo head by reading the servo information on the servo surface and adjusting the position of the servo head accordingly, data tracks on the remaining disc surfaces can be accessed by the data heads in order to read and write data, respectively. An example of a typical dedicated servo system is disclosed in U.S. Pat. No. 5,262,907 entitled HARD DISC DRIVE WITH IMPROVED SERVO SYSTEM, issued Nov. 16, 1993 to Duffy et al., assigned to the assignee of the present invention and incorporated herein by reference.

A second type of servo system is an embedded servo system, wherein the servo information is provided on each of the disc surfaces and embedded between data portions, so that each head serves as both a servo head and a data head and each track contains both data and servo information. As will be recognized by those skilled in the art, the use of embedded servo systems allows a greater amount of data to be stored by the drive, as generally less total space is required for the servo information. Such drives utilizing embedded servo systems typically include state estimator circuitry to estimate the position of the heads at such times that the heads are not located over servo information fields.

For both dedicated and embedded servo systems, the servo information is typically written to the disc drives during manufacturing using servo track writers. A servo track writer precisely positions the heads in a disc drive in order to write the servo information to the drive. As the servo information defines the subsequent tracks, it is important to precisely control the position of the heads as the servo information fields are written to the disc surfaces. Thus, a servo track writer typically includes a positioning system, which includes a pusher pin which engages the actuator assembly, a position detector which detects the position of the pusher pin and a motor which corrects the position of the pusher pin in response to correction signals from the position detector. Additionally, a typical servo track writer includes control circuitry for providing the servo information to the heads for writing the servo information to the discs at the appropriate locations. As track densities continue to increase, it is increasingly common to use highly precise positioning systems, such as laser based, closed loop feedback systems which incrementally move the actuator assembly to successive tracks during the servo track writing operation. For a more detailed discussion of methods for writing servo data to a disc drive, see U.S. Pat. No. 5,164,863 entitled METHOD FOR WRITING SERVO PATTERNS TO A DISC OF A HARD DISC DRIVE, issued Nov. 17, 1992 to Janz and U.S. Pat. No. 5,241,430 entitled METHOD AND APPARATUS FOR ALTERNATIVELY READING OR WRITING DATA TO A SERVO SURFACE OF A HARD DISC DRIVE, issued Aug. 31, 1993 to Janz. Both of these references are assigned to the assignee of the present invention and are incorporated herein by reference.

As will be recognized, the servo information fields define the data tracks on the discs. Should the servo information not be precisely written in a concentric fashion, components at selected frequencies can appear in a position error signal (PES) generated by the servo system during subsequent operation of the drive. The PES is a measure of the relative position of a selected head with respect to an associated track and is used primarily during track following operations to maintain the head over the center of the track. Thus, when the servo information is not concentric, frequencies can appear in the PES and the servo system will repeatedly adjust the position of the head to maintain the head over the center of the track during each revolution of the disc. When such frequencies are sufficiently severe, the correction required to account for these frequencies can require a significant amount of the total track misregistration budget, limiting the overall track density that can be achieved in a disc drive design.

Frequencies can occur in the PES as a result of system resonances induced in the servo track writer as the servo information is written. Such resonances can arise from, for example, vibrations generated by the operation of the spindle motor during rotation of the discs. Of particular interest are resonances which occur locally at the pusher pin, as these are most likely to affect the position of the head and hence, the location on the discs where the servo information fields are written. Positioning system manufacturers have taken steps to reduce these resonances, including efforts to stiffen the pusher pin and the associated pusher pin assembly. However, to date such efforts have not been completely successful in eliminating the effects of resonances during the writing of the servo information. As track densities continue to increase, errors in the writing of the servo information will increasingly provide problems during disc drive operation.

There is a need, therefore, for an improved approach to reducing the system resonances in a disc drive servo track writer in order to reduce or eliminate the effects of frequency components in a PES generated from the servo information during subsequent disc drive operation. It is to such a need that the present invention is directed.

SUMMARY OF THE INVENTION

The present invention comprises an improved servo track writer used for the writing of servo information to a head disc assembly. The servo track writer includes a tuned damper as part of a pusher block assembly, the tuned damper reducing the effects of errors in the written servo information as a result of resonant frequencies induced in the pusher block assembly.

Accordingly, the tuned damper of the pusher block assembly comprises a dampening block having a selected mass and a dampening pad comprising a layer of compliant material, the dampening pad isolating the dampening block from the rest of the pusher block assembly. The desired resonant frequency response of the pusher block assembly is achieved through selection of the mass of the dampening block and the compliance of the dampening pad.

In the preferred embodiment, the pusher block assembly comprises a central shaft assembly about which a polycarbonate clamp portion rotates. A pusher pin extends from the clamp portion and engages an actuator assembly of the head disc assembly, in order to position a head of the actuator assembly during the servo write operation. The dampening block and dampening pad are disposed below the clamp portion, with the dampening pad attached to a portion of the bottom surface of the clamp portion and the dampening block attached to, and suspended from, the dampening pad.

An object of the present invention is to improve the writing of servo information to a head disc assembly.

Another object is to reduce the effects of frequencies in the PES of a disc drive as a result of system resonances induced in a servo track writer by the operation of the head disc assembly spindle motor during a servo write operation.

Yet another object is to provide the ability to tune the resonant frequency response of a pusher block assembly of the servo track writer.

Other objects, advantages and features of the present invention will be apparent from the following description when read in conjunction with the drawings and appended claims.

DETAILED DESCRIPTION OF THE PREFERRED EMBODIMENT

Figure 1:
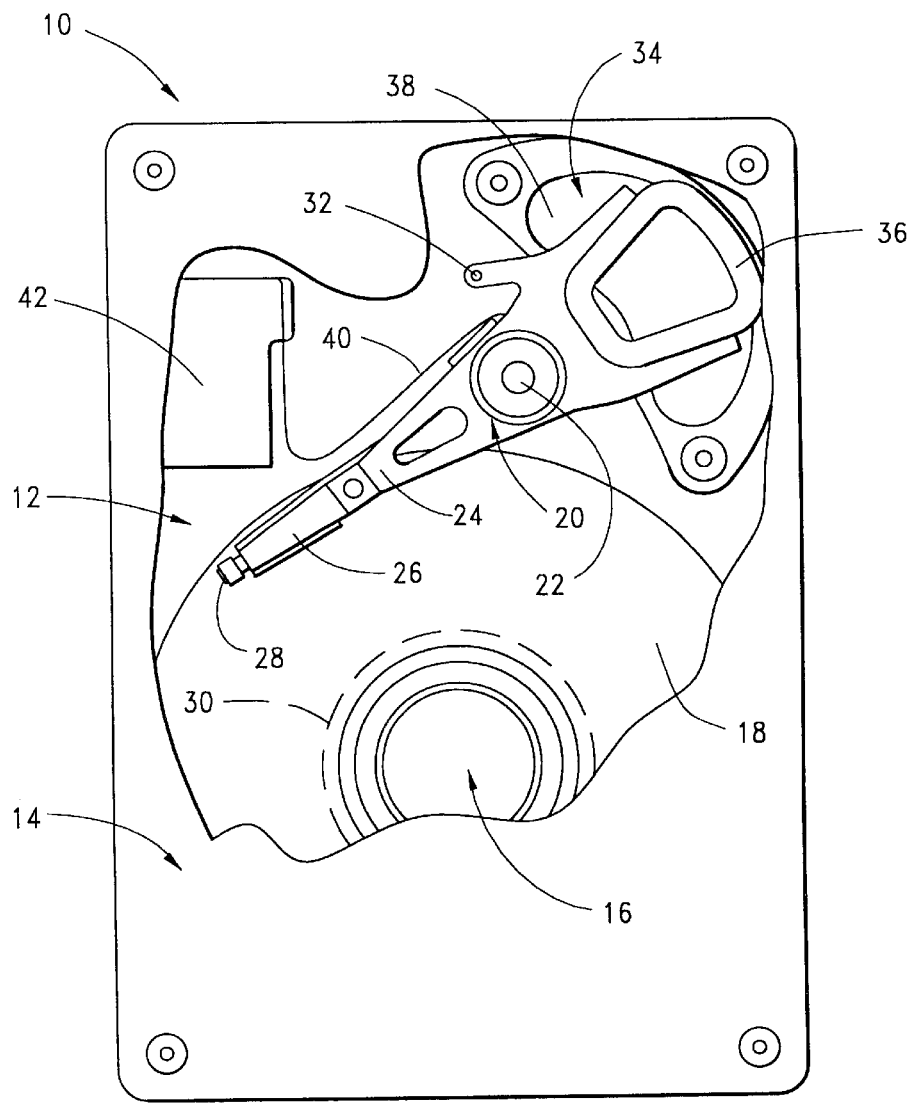
FIG. 1 is a top plan view of a head disc assembly with which the present invention is particularly useful.

Turning now to the drawings and more particularly to FIG. 1, shown therein is a top plan view of a head disc assembly (HDA) 10 in which the present invention is particularly useful. As will be recognized, the HDA 10 composes substantially all of the elements of a disc drive with the exception of a printed circuit board (PCB) which is typically attached to the bottom of the HDA 10.

The HDA 10 includes a base deck 12 to which various disc drive components are mounted and a top cover 14, which is shown in a partial cut-away fashion to expose selected components of interest. It will be readily understood that the base deck 12 includes an interior surface to which various disc drive components are mounted as well as side walls which, in combination with the top cover 14, provide sufficient height to house these components within a sealed internal environment.

Mounted to the base deck 12 is a spindle motor (shown generally at 16) to which a plurality of discs 18 are mounted for rotation at a constant high speed. Adjacent the discs 18 is an actuator assembly 20 (hereinafter also referred to as an "E-block") which pivots about a pivot shaft assembly 22 in a rotary fashion. The E-block 20 includes actuator arms 24 which support gimbal assemblies 26 (hereinafter also sometimes referred to as "load springs"). The load springs 26 in turn support heads 28, with each of the heads 28 corresponding to a surface of one of the discs 18. As provided hereinabove, the heads 28 are positionably located over data tracks (not shown) of the discs 18 in order to read data from and write data to the tracks, respectively. At such time that the HDA 10 is not in an operational mode, the heads 28 are typically moved to landing zones (denoted at broken line 30), which are located in FIG. 1 near the inner diameter of the discs 18.

It will be recognized that the E-block 20 is provided with a latching arrangement (shown generally at 32) to secure the heads 28 over the landing zones 30. For a general discussion of typical E-block latching arrangements, see U.S. Pat. No. 5,231,556 entitled SELF-HOLDING LATCH ASSEMBLY, issued Jul. 27, 1993 to Blanks, assigned to the assignee of the present invention and incorporated herein by reference.

Continuing with FIG. 1, the E-block 20 is controllably positioned by way of a voice coil motor (VCM, shown generally at 34), comprising an actuator coil 36 immersed in the magnetic field generated by a permanent magnet 38. It will be recognized that a magnetically permeable flux path (such as a second permanent magnet in conjunction with a steel plate) is mounted above the actuator coil 36 to complete the magnetic circuit of the VCM 34, but for purposes of illustration this flux path has not been shown in FIG. 1. When controlled DC current is passed through the actuator coil 36, an electromagnetic field is set up which interacts with the magnetic circuit of the VCM 34 to cause the actuator coil 36 to move relative to the permanent magnet 38 in accordance with the well-known Lorentz relationship. As the actuator coil 36 moves, the E-block 20 pivots about the pivot shaft assembly 22, causing the heads 28 to move across the surfaces of the discs 18.

To provide the requisite electrical conduction paths between the heads 28 and disc drive read/write circuitry resident on the PCB (not shown), head wires (not separately shown) are routed on the E-block 20 from the heads 28, along the gimbal assemblies 26 and the actuator arms 24, to a flex circuit assembly 40. The head wires are secured to corresponding pads of the flex circuit assembly 40. In turn, the flex circuit assembly 40 is connected to a flex circuit bracket (shown generally at 42) in a conventional manner to facilitate communication between the flex circuit bracket 42 and the PCB once the PCB is mounted to the underside of the HDA 10.

Figure 2:
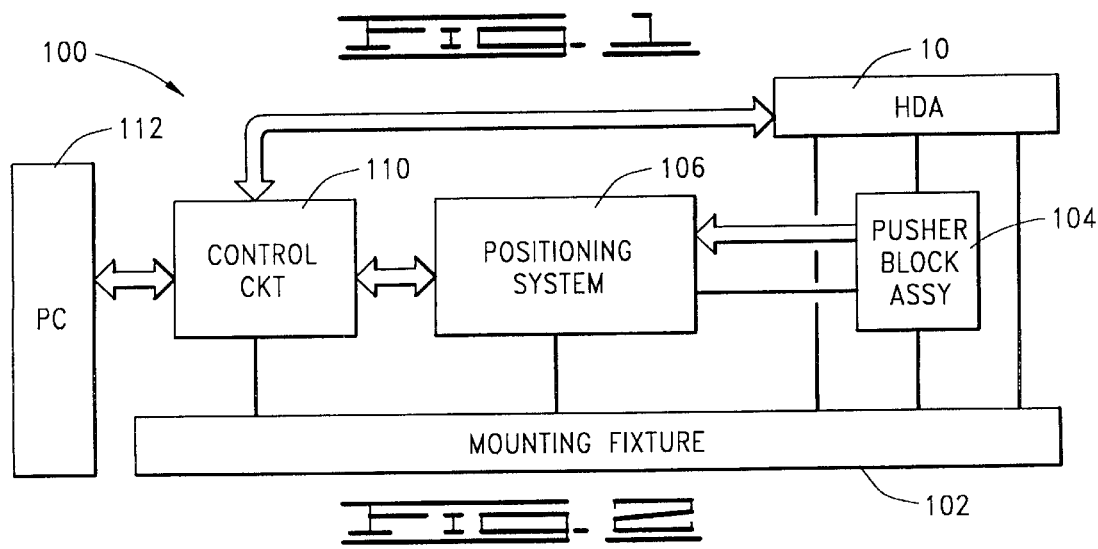
FIG. 2 is a schematic representation of a servo track writer used to write the servo information to the discs of the head disc assembly of FIG. 1.

Referring now to FIG. 2, shown therein is a schematic representation of a servo track writer 100, constructed in accordance with the preferred embodiment of the present invention. As discussed below, the servo track writer 100 serves to write the servo information to the discs 18 (shown in FIG. 1) during manufacturing of the HDA 10.

As shown in FIG. 2, the HDA 10 is mounted over a mounting fixture 102 which serves as a mechanical reference for the servo track writer 100. The mounting fixture 102 typically comprises a granite block (not separately designated in FIG. 2) having a calibrated, level top surface on which a mounting plate (also not separately designated in FIG. 2) is placed. The mounting plate includes clamps (not shown) which locate and secure the HDA 10 to the mounting fixture 102. As such mounting fixtures 102 are well known, additional discussion will not be provided herein except to state that the HDA 10 is mounted in such a manner so as to provide access to the E-block 20 (shown in FIG. 1) by the servo track writer 100 during a servo write operation.

Continuing with FIG. 2, a pusher block assembly 104 is also mounted to the mounting fixture 102 underneath the HDA 10 so as to engage the actuator assembly 20 of the HDA 10 in order to selectively position the actuator assembly 20 relative to the discs 18. Although the pusher block assembly 104 will be described in greater detail below, typically an opening (not shown) is provided in the bottom of the base deck 12 (shown in FIG. 1) of the HDA 10 so that the pusher block assembly 104 can access the internal environment of the HDA 10 by extending up through the opening in the base deck 12. Once the servo information is written, the opening is typically covered by an adhesive label or other means to seal the internal environment of the HDA. Further, it will be recognized that, as actuator assemblies (such as shown at 20 in FIG. 1) typically include a mechanical bias either towards the inner or the outer diameter of the discs 18, the pusher pin engages the actuator against this bias and exerts a horizontal force upon the actuator. Thus, it is unnecessary to mechanically secure the pusher block assembly 104 to the actuator assembly 20; instead, the existing bias of the actuator assembly is typically used to ensure contact is maintained between the pusher block assembly 104 and the actuator assembly 20.

Moreover, the servo track writer 100 further comprises a conventional positioning system 106 which rotates the pusher block assembly 104 about a central axis (not shown in FIG. 2, for purposes of clarity) in order to advance the position of the actuator assembly 20. The position of the pusher block assembly 104 is controlled by the positioning system 106 through detection means (not separately shown) which detects the position of the pusher block assembly 104 and provides correction signals to a motor (also not separately shown) of the positioning system 106 in order to rotate the pusher block assembly 104 accordingly. In the preferred embodiment, the positioning system 106 comprises a laser based, closed loop positioner utilizing a laser and appropriate sensors to detect the position of the pusher block assembly 104, although it will be recognized that other types of positioning systems can be used. One such laser based positioning system is model 137K15, manufactured by Teletrak Inc. As will be recognized, the positioning system 106 is mounted to the mounting fixture 102 relative to the HDA 10.

Continuing with FIG. 2, the servo track writer 100 is further shown to include a control circuit 110 which interfaces with a PC 112 and controls the operation of the servo track writer 100 and the HDA 10 during a servo write operation, including the transfer of the servo information to the HDA 10 from the PC 112.

During operation of the servo track writer 100 to write the servo information to the HDA 10, a user mounts the HDA 10 to the mounting fixture 102 and instructs the servo track writer 100 (by way of the PC 112) to commence writing the servo information to the HDA 10. As a result, the controller circuit 110 instructs the HDA 10 to commence rotation of the discs 18 by way of the spindle motor 16 (shown in FIG. 1) and instructs the pusher block assembly 104 to place the actuator assembly 20 at a starting position (typically near the outer diameter of the discs 18). The servo track writer 100 will thereafter instruct the HDA 10 to write the servo information to each of the surfaces of the discs 18, while mechanically advancing the pusher block assembly 104 so as to define each new successive track on the discs 18. For dedicated servo systems, the entire surface of one of the discs 18 will receive the servo information, written by the corresponding servo head 28 (shown in FIG. 1). For embedded servo systems, each of the heads 28 in turn will write the servo information to the corresponding discs at the appropriate locations.

The time required to write the servo information to a typical HDA depends upon the amount of servo information to be written to the discs, the rotational speed of the discs 18 and the number of discs 18, but for purposes of reference, it may take the servo track writer 100 as much as 30 minutes to complete the servo write operation. Typically, the servo write operation requires a relatively significant amount of time in a large scale disc drive manufacturing operation wherein thousands of disc drives are manufactured each day. Hence, the importance of correctly writing the servo information to the HDA 10 will be recognized, as the time required to rewrite servo information to a population of drives can be extensive. Although servo track writers 100 typically perform some level of testing of the servo information, frequencies in the PES may not be detected until subsequent manufacturing operations when the PCB is mated with the HDA 10 and system level testing of the disc drive is performed.

Figure 3:
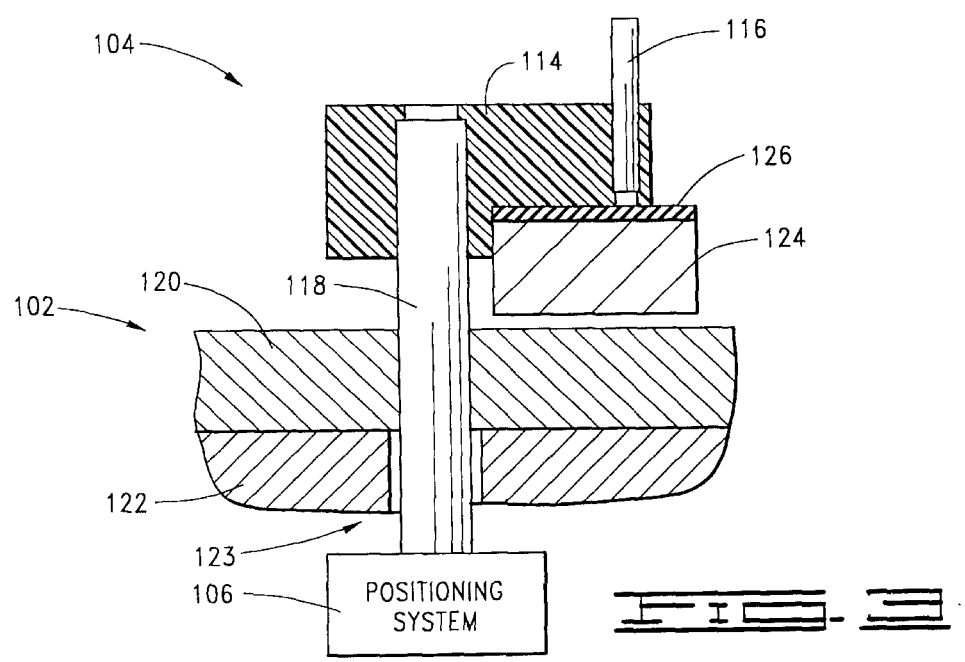
FIG. 3 is an elevational, cross-sectional view of the pusher block assembly of FIG. 2, including a tuned damper constructed in accordance with the preferred embodiment of the present invention.

Having concluded an overview of the servo track writer 100 of FIG. 2, reference is now made to FIG. 3, which provides an elevational view of the pusher block assembly 104 and portions of the mounting fixture 102 of FIG. 2, constructed in accordance with the preferred embodiment of the present invention. As shown in FIG. 3, the pusher block assembly 104 includes a polycarbonate clamp 114 which secures a vertically aligned pusher pin 116 used to position the actuator assembly 20 of the HDA 10 (FIG. 1).

The clamp 114 is coupled for rotation about a shaft assembly 118 which is secured to a mounting plate 120 of the mounting fixture 102. The mounting plate 120, in turn, is disposed over a conventional granite block 122 (having a calibrated top surface). Thus, the shaft assembly 118 is mounted so the clamp 114 precisely rotates about an axis which is orthogonal to the plane defined by the top surface of the granite block 122. Moreover, an opening 123 is provided in the granite block 122 to facilitate connection of the shaft assembly 118 to the positioning system 106, as shown. As the construction and operation of the positioning system 106 is conventional, further details have been omitted from FIG. 3 for purposes of clarity; however, it will be understood that the positioning system 106 is mounted so as to correctly detect and control the angular position of the pusher pin 116.

Continuing with FIG. 3, a dampening block 124 is provided as part of the pusher block assembly 104, the dampening block 124 preferably comprising stainless steel or other suitable material. The dampening block 124 is rectangularly shaped and dimensioned so as to allow rotation of the pusher block assembly 104 over the mounting plate 120 without interference. A dampening pad 126 is disposed between the dampening block 124 and the clamp 114, the dampening pad 126 preferably comprising a thin layer of natural latex rubber. Adhesive is used to secure the constituent components as shown in FIG. 3.

The mass of the dampening block 124, which is located below the pusher pin 116, serves to increase the total mass of the pusher block assembly 104, and hence to change the resonant frequency response of the pusher block assembly 104. By selecting a suitable mass for the dampening block 124, the frequencies of the resonances induced in the pusher pin 116 (and hence, the servo information written to the discs 18 of FIG. 1) can be shifted to a frequency that will not substantially affect the writing of the servo information, and in turn, the servo system performance.

Furthermore, isolating the dampening block 124 from the rest of the pusher block assembly 104 by way of the damping pad 126 reduces the amplitude of the resonant frequencies induced in the pusher block assembly 104 to a level which can be accommodated by the servo system. Thus, both the dampening block 124 and the dampening pad 126 can be tuned as desired to obtain a desired resonant response from the servo track writer 100 of FIG. 2, and hence, the reduction or elimination of frequencies in the PES. For purposes of disclosure, the dampening block 124 preferably comprises a rectangular block of 400 series stainless steel having dimensions of about 0.95×0.75×0.50 inches. Further, the dampening pad 126 preferably comprises a layer of natural latex rubber about 0.25 inches thick.

Figure 4:
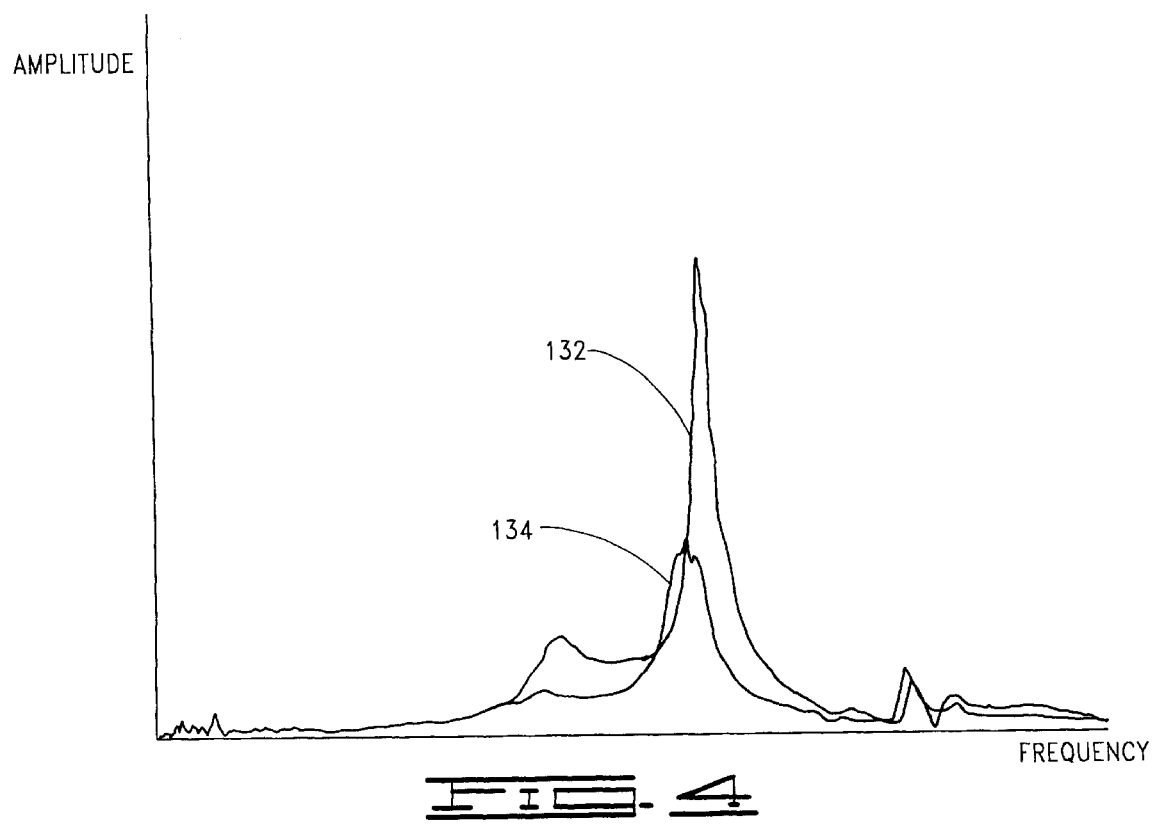
FIG. 4 is a graphical representation of the resonant frequency response of the pusher block assembly of FIG. 2, both with and without the use of the tuned damper shown in FIG. 3.

By way of illustration, FIG. 4 has been provided which shows a graphical representation of the resonant response of the servo track writer 100 at the pusher block assembly 104, both with and without the use of the damper block 124 and the damper pad 126. Particularly, the horizontal axis denotes frequency and the vertical axis indicates relative amplitude of the resonances induced at the pusher block assembly 104 during the servo write operation on the HDA 10.

As shown in FIG. 4, curve 132 represents the resonant response at the pusher block assembly 104 without the use of the dampening block 124 and the dampening pad 126. For reference, the curve 132 is a representation of actual data obtained from a population of selected disc drives (Seagate Hawk 2XL) which exhibited a 435 Hz frequency in the PES. The cause of the frequency in the PES was the system resonance of the servo track writer 100 as a result of excitation by the spindle motor 16. As shown in FIG. 4, this resonance occurred at a relatively large amplitude.

The addition of the dampening block 124 and the dampening pad 126 to the pusher block assembly 104 results in an improved resonant response, as indicated by curve 134. As shown in FIG. 4, the curve 134 indicates a shift in the frequency at which the maximum resonance occurs, as well as a reduction in the amplitude of the resonant response. The addition of both the mass provided by the dampening block 124 and the compliance provided by the dampening pad 126 effectively reduces the amplitude of the resonance and shifts the frequencies where maximum resonance occurs. Thus, by tuning the damping characteristics of the pusher block assembly 104, a desired frequency response, and resulting PES performance in the HDA 10 can be readily achieved.

It will be clear that the present invention is well adapted to carry out the objects and attain the ends and advantages mentioned as well as those inherent therein. While presently preferred embodiments have been described for purposes of this disclosure, numerous changes may be made which will readily suggest themselves to those skilled in the art and which are encompassed in the spirit of the invention disclosed and as defined in the appended claims.

What is claimed is:

1. A servo track writer for writing servo information to a head disc assembly, the head disc assembly including a disc and a rotary actuator adjacent the disc, the actuator including a read/write head for selectively magnetizing the disc, the servo track writer comprising:

a mounting fixture for mounting the head disc assembly, the mounting fixture providing a mechanical reference for the servo track writer as servo information is written to the head disc assembly;

a pusher block assembly, mounted to the mounting fixture and proximate to the actuator of the head disc assembly, for mechanically positioning the actuator; and position control means for controlling the position of the actuator, the position control means comprising:
   a motor connected to the pusher block assembly;
   a positioning system for detecting the position of the actuator and outputting control signals to the motor in order to adjust the position of the actuator in response to the detected position of the actuator and a desired position of the actuator;

wherein the pusher block assembly comprises:
   a shaft supported by the mounting fixture, the shaft defining a first axis;
   a clamp portion, attached to the shaft, for rotation about the first axis, the rotation of the clamp portion controlled by the motor;
   a pusher pin, extending from the clamp portion, the pusher pin engaging the actuator in order to position the actuator as the servo information is written to the disc, the pusher pin disposed at a selected distance from the shaft so that the pusher pin travels along an arcuate path as the clamp portion rotates about the first axis;
   a dampening block having a selected mass; and
   a dampening pad disposed between and attached to the clamp portion and the dampening block so that the dampening block is mechanically isolated by the dampening pad, the dampening pad comprising a layer of compliant material;

wherein the mass of the dampening block and the compliance of the dampening pad are selected to provide a desired resonant frequency response for the pusher block assembly.

2. The servo track writer of claim 1, wherein the clamp portion includes a bottom surface portion and wherein the dampening pad and the dampening block are disposed below the bottom surface of the clamp portion.

3. The servo track writer of claim 2, wherein the clamp portion further includes a top surface portion, wherein the pusher pin extends from the top surface portion of the clamp portion in a second axis substantially parallel to the first axis, and wherein the dampening pad and the dampening block are disposed below the pusher pin.

4. The servo track writer of claim 1, wherein the dampening block comprises a block of stainless steel.

5. The servo track writer of claim 1, wherein the dampening pad comprises a layer of natural latex rubber.

6. An improved servo track writer of the type used to write servo information to a head disc assembly, the servo track writer including a mounting fixture for securing the head disc assembly during a servo write operation in which the servo information is written to a disc of the head disc assembly by an actuator assembly of the head disc assembly, the actuator assembly including a head which selectively magnetizes the disc in response to write signals supplied to the head by the servo track writer, the servo track writer further including a pusher block assembly disposed below the head disc assembly for mechanically positioning the actuator and a positioning system for detecting the position of the actuator and outputting control signals to a servo track writer motor in order to adjust the position of the actuator in response to the detected position of the actuator and a desired position of the actuator, the improvement comprising an improved pusher block assembly including:

a shaft assembly supported by the mounting fixture, the shaft assembly defining a first axis;

a clamp attached to the shaft assembly for rotation about the first axis;

a pusher pin extending from the clamp, the pusher pin engaging the actuator of the head disc assembly to advance the position of the actuator as the servo information is written to the disc, the pusher pin disposed at a selected distance from the shaft and traveling along an arcuate path as the clamp rotates about the first axis; and a tuned damper attached to the clamp, the tuned damper comprising:

a dampening block having a selected mass; and a dampening pad disposed between and attached to the clamp and the dampening block so that the dampening block is mechanically isolated from the clamp by the dampening pad, the dampening pad comprising a layer of compliant material;

wherein the mass of the dampening block and the compliance of the dampening pad are selected to provide a desired resonant frequency response for the pusher block assembly.

7. The pusher block assembly of claim 6, wherein the tuned damper is disposed below a bottom surface of the clamp portion.

8. The improvement of claim 7, wherein the pusher pin extends from the top surface portion of the clamp portion in a second axis substantially parallel to the first axis, and wherein the dampening pad and the dampening block are disposed below the pusher pin.

9. The improvement of claim 6, wherein the dampening block comprises stainless steel.

10. The improvement of claim 6, wherein the dampening pad comprises a layer of natural latex rubber.

* * * * *